(12) United States Patent
Drussel et al.

(10) Patent No.: US 7,014,026 B2
(45) Date of Patent: Mar. 21, 2006

(54) MANUAL/AUTOMATIC PRESSURE CONTROL MECHANISM FOR CENTRIFUGAL CLUTCH

(75) Inventors: Douglas W. Drussel, Sedalia, CO (US); George Michael Wilfley, Englewood, CO (US)

(73) Assignee: Drussel Wilfley Design, L.L.C., Denver, CO (US)

( * ) Notice: Subject to any disclaimer, the term of this patent is extended or adjusted under 35 U.S.C. 154(b) by 0 days.

(21) Appl. No.: 10/791,949

(22) Filed: Mar. 2, 2004

(65) Prior Publication Data

US 2005/0000775 A1 Jan. 6, 2005

Related U.S. Application Data

(63) Continuation-in-part of application No. 10/327,160, filed on Dec. 20, 2002, now Pat. No. 6,814,208, and a continuation-in-part of application No. 09/877,518, filed on Jun. 7, 2001, now Pat. No. 6,705,446.

(51) Int. Cl.
*F16D 43/08* (2006.01)
(52) U.S. Cl. .................... 192/105 B; 192/83
(58) Field of Classification Search ............ 192/70.23, 192/70.28, 83, 89.1, 93 R, 93 C, 96, 103 R, 192/105 B, 109 A
See application file for complete search history.

(56) References Cited

U.S. PATENT DOCUMENTS

| | | |
|---|---|---|
| 1,743,170 A | 1/1930 | Vail |
| 2,412,331 A | 12/1946 | Green |
| 2,555,860 A | 6/1951 | Reed |
| 2,717,674 A | 9/1955 | Crichton, Jr. |
| 2,721,639 A | 10/1955 | Miller |
| 2,921,476 A | 4/1960 | Zeidler et al. |
| 3,001,623 A | 9/1961 | Fawick |
| 3,003,608 A | 10/1961 | Biraben |
| 3,215,234 A | 11/1965 | Hirano |
| 3,265,172 A | 8/1966 | Atsumi et al. |
| 3,762,519 A | 10/1973 | Bentley |
| 3,842,954 A | 10/1974 | Honemann |
| 3,939,734 A | 2/1976 | Blanchette et al. |
| 4,457,185 A | 7/1984 | Yoshida et al. |
| 4,518,070 A | 5/1985 | Ooka |
| 4,576,269 A | 3/1986 | Hamane et al. |
| 4,592,458 A | 6/1986 | Matsuki et al. |
| 4,645,049 A | 2/1987 | Matsuda et al. |
| 4,690,258 A | 9/1987 | Teraoka et al. |
| 4,732,252 A | 3/1988 | Kittel |

(Continued)

*Primary Examiner*—Saul Rodriguez
(74) *Attorney, Agent, or Firm*—John E. Reilly

(57) ABSTRACT

A centrifugal clutch for motorcycles having a cam-actuating mechanism to force a series of clutch plates into clutching engagement at a predetermined speed, a pressure limiting spring assembly limits the axial force transmitted to the clutch members at higher speeds so that the torque transmission characteristics of the clutch are similar to a manual clutch, and a manual override is capable of maintaining the clutch plates in the disengaged position at lower speeds as well as shifting the clutch members out of clutching engagement at higher speeds with relatively low exertion of manual or hand pressure.

30 Claims, 9 Drawing Sheets

U.S. PATENT DOCUMENTS

| | | |
|---|---|---|
| 4,986,403 A | 1/1991 | Tipton |
| 5,033,598 A | 7/1991 | Tipton |
| 5,361,882 A | 11/1994 | Tipton |
| 5,423,406 A | 6/1995 | Antonov |
| 5,441,137 A | 8/1995 | Organek et al. |
| 5,669,480 A | 9/1997 | Kooy et al. |
| 5,733,217 A | 3/1998 | Naraki et al. |
| 6,315,096 B1 | 11/2001 | Dairokuno et al. |
| 6,533,056 B1 * | 3/2003 | Maimone .................... 180/230 |
| 6,705,446 B1 * | 3/2004 | Drussel et al. ................ 192/83 |
| 6,814,208 B1 * | 11/2004 | Drussel et al. .......... 192/105 B |

* cited by examiner

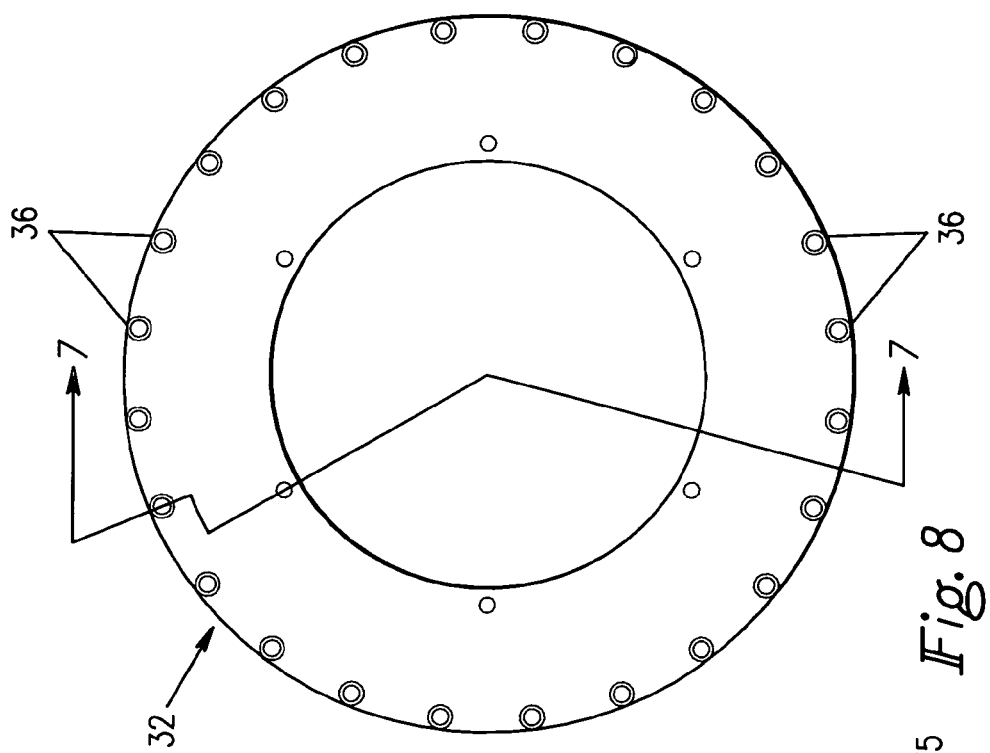
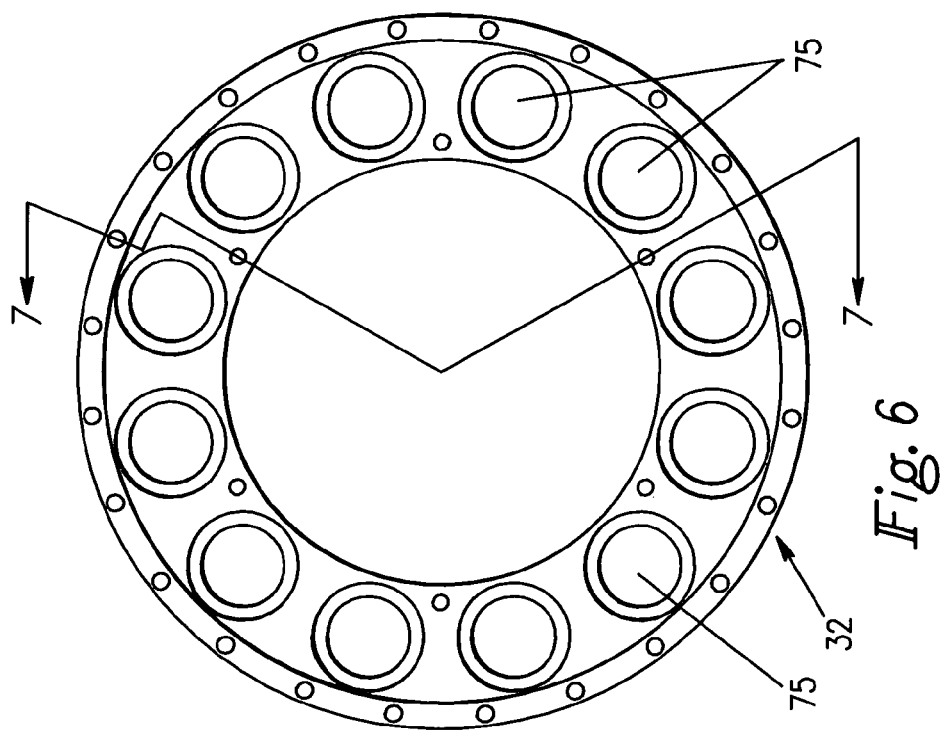

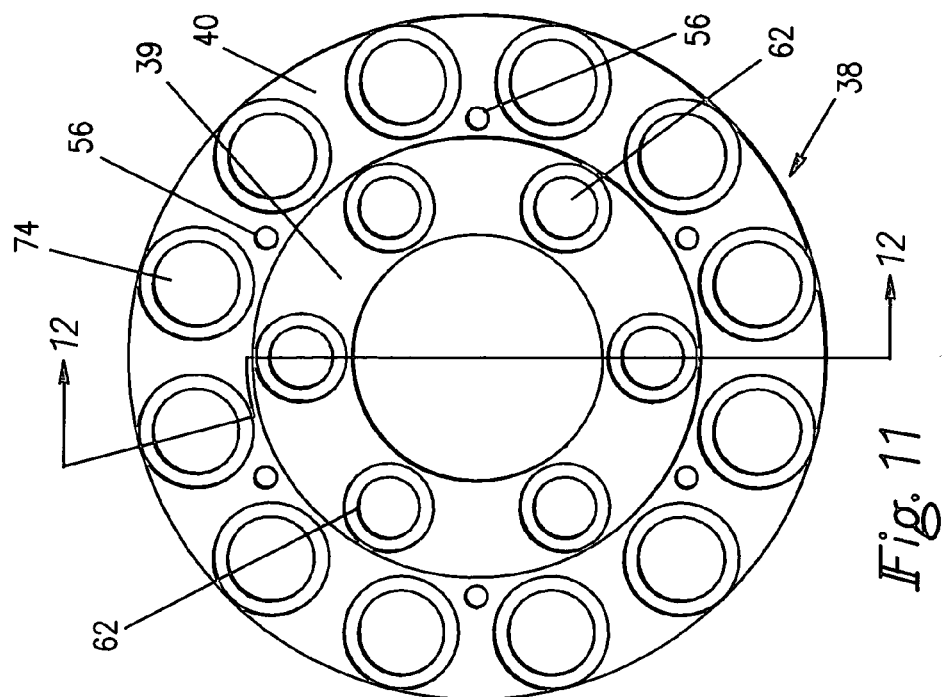
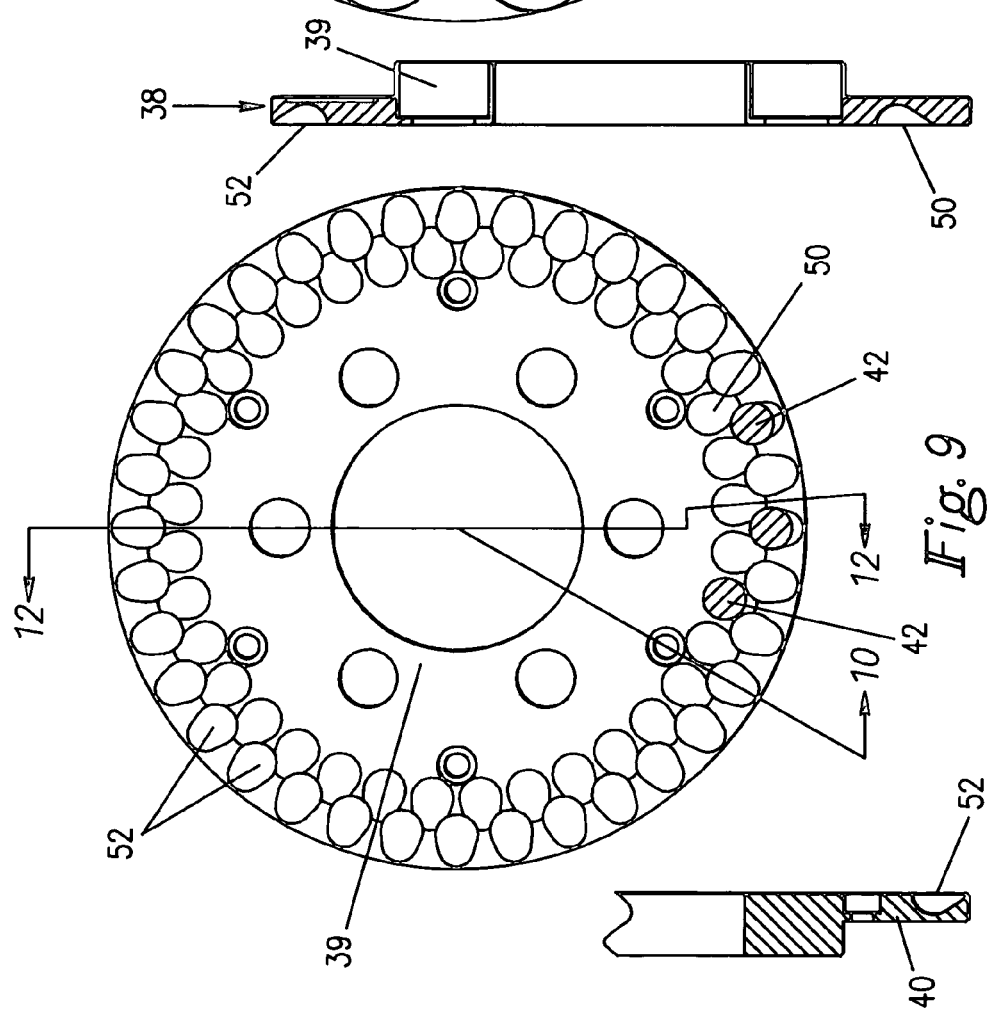

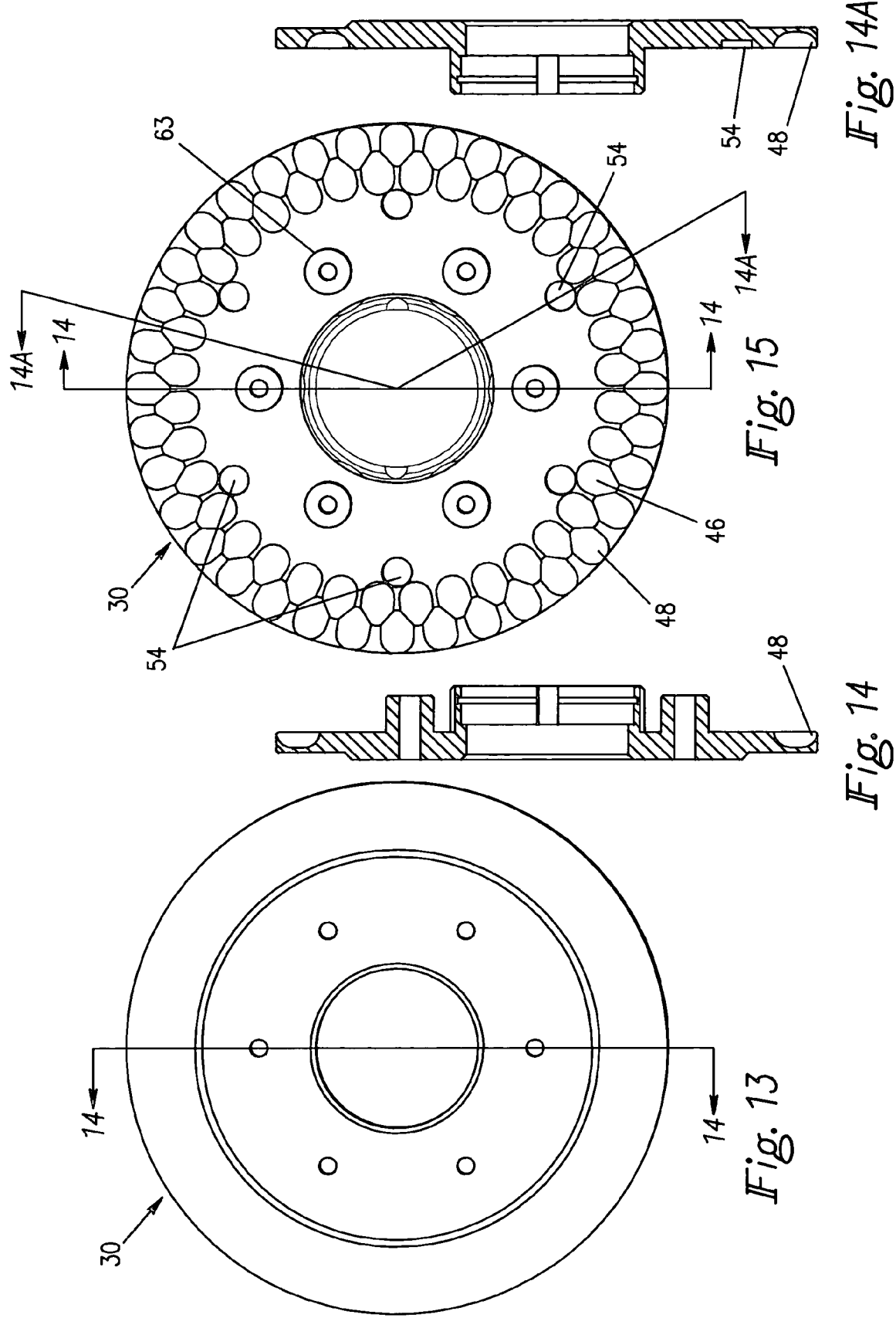

MANUAL/AUTOMATIC PRESSURE CONTROL MECHANISM FOR CENTRIFUGAL CLUTCH

CROSS-REFERENCE TO RELATED APPLICATIONS

This application is a continuation-in-part of patent application Ser. No. 09/877,518, filed 7 Jun. 2001 now U.S. Pat. No. 6,705,446 for AUTOMATIC CLUTCH WITH MANUAL OVERRIDE CONTROL MECHANISM and application Ser. No. 10/327,160, filed 20 Dec. 2002 now U.S. Pat. No. 6,814,208 for MULTI-ROW CAM-ACTUATED CENTRIFUGAL CLUTCH, both applications by Douglas W. Drussel and George Michael Wilfley, both being applications assigned to the assignee of this and incorporated by reference herein.

BACKGROUND AND FIELD

This apparatus relates to centrifugal clutches and more particularly relates to a novel and improved centrifugal clutch which is capable of manual and automatic control of the maximum pressure exerted on the clutch plates when moved into the engaged position as well as the amount of pressure required to disengage the clutch plates.

We have previously devised centrifugal clutches of the type having a plurality of cam members or balls which will move outwardly in response to rotation of a drive shaft to force a plurality of clutch plates into engagement with one another. In certain applications, such as, motorcycle clutches it is important to generate sufficient centrifugal force to clamp the clutch plates together without substantial slippage and without utilizing a larger sized case which exceeds the space allowances within a stock or standard engine case. Space is at a particular premium in motorcycle clutches incorporating a manual override mechanism, such as, set forth in hereinbefore referred to U.S. application Ser. No. 10/327,160 for MULTI-ROW CAM-ACTUATED CENTRIFUGAL CLUTCH. Further, it is desirable to incorporate into the end of the clutch case between the cover and pressure plate a pressure control mechanism which will combine the features of an automatic clutch with the performance of a traditional manual clutch so that the clutch can engage smoothly without the use of a clutch lever at low speeds but at the same time limit the axial force transmitted to the clutch plates by the cam members at higher speeds. In addition, it is highly desirable that the pressure control mechanism cooperate with the manual override lever in such a way as to minimize the hand pressure required to override the cam members and effectively operate as a conventional manual clutch with relatively light feel or manual pressure and yet be capable of operating within the same space limitations as the standard or stock motorcycle clutches.

SUMMARY

It is therefore desirable to provide for a novel and improved clutch of a type which is capable of controlling the maximum pressure exerted on the clutch elements while assuring non-slipping clutch engagement up to a predetermined force or pressure level as well as being manually controllable to disengage independently of the pressure control mechanism; further to provide, in a centrifugal clutch of the type having an internal manual disengagement mechanism, for an automatic pressure control mechanism which will limit the maximum pressure to which the clutch elements can be subjected and without expanding the size of clutch housing required; and further provide, in a motorcycle clutch, for non-slipping engagement under normal operating conditions while limiting the maximum pressure to which the clutch elements can be subjected in order to permit controlled slippage of the clutch elements when subjected to shock loads imparted through the drive train of the vehicle on which the clutch is mounted; and further to provide in a motorcycle clutch for a maximum pressure spring control mechanism of the type employing multiple, circumferentially spaced springs between a cover and retainer plate for the centrifugal clutch-actuating mechanism to limit the maximum amount of pressure applied to the clutch members and to mount same within a standard or stock motorcycle case.

The features of one embodiment reside in a centrifugal clutch of the type having a plurality of cam members or balls interposed between a cover and pressure plate, the cam members being movable radially outwardly under centrifugal force to cause the pressure plate to move in a direction forcing the clutch members into clutching engagement, the improvement comprising cam retainer means between the pressure plate and cover for retaining the cam members in one or more concentric rows whereby to guide inward and outward radial movement of the cam members, first fastener means for maintaining a predetermined spacing between the cover and the retainer means, second fastener means for maintaining a predetermined spacing between the pressure plate and retainer means including means resiliently biasing the pressure plate and retainer means toward one another, and a series of circumferentially spaced resilient biasing members interposed between the cover and retainer means and wherein the resilient biasing members are operative to undergo compression in response to continued radially outward movement of the cam members once the force exerted on the friction plates equals the force exerted by the resilient biasing members on the pressure plate and retainer means.

There has been outlined, rather broadly, the more important features of one aspect in order that the detailed description thereof that follows may be better understood, and in order that the present contribution to the art may be better appreciated. There are, of course, additional features that will be described hereinafter and which will form the subject matter of the claims appended hereto. In this respect, before explaining at least one embodiment in detail, it is to be understood that the embodiment is not limited in its application to the details of construction and to the arrangements of the components set forth in the following description. The embodiment is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes herein described. It is important, therefore, that the claims be regarded as including such equivalent constructions insofar as they do not depart from the spirit and scope thereof.

BRIEF DESCRIPTION OF THE DRAWINGS

FIG. 6 is an end view of a stationary cover portion of the clutch shown in FIGS. 1 to 5;

FIG. 7 is a cross-sectional view taken about lines 7—7 of FIG. 6 and of FIG. 8;

FIG. 8 is an opposite end view to that of FIG. 6;

FIG. 9 is an end view of a movable cover portion for the clutch of FIGS. 1 to 5;

FIG. 10 is a cross-sectional view taken about lines 10—10 of FIG. 9;

FIG. 11 is an opposite end view to that of FIG. 9;

FIG. 12 is a cross-sectional view taken about lines 12—12 of FIGS. 9 and 11;

FIG. 13 is an end view of a pressure plate employed in the clutch of FIGS. 1 to 5;

FIG. 14 is a cross-sectional view taken about lines 14—14 of FIGS. 13 and 15;

FIG. 14A is a cross-sectional view taken about line 14A of FIG. 15;

FIG. 15 is an opposite end view of the cover shown in FIG. 13; and

DETAILED DESCRIPTION

Figures 1, 1A:
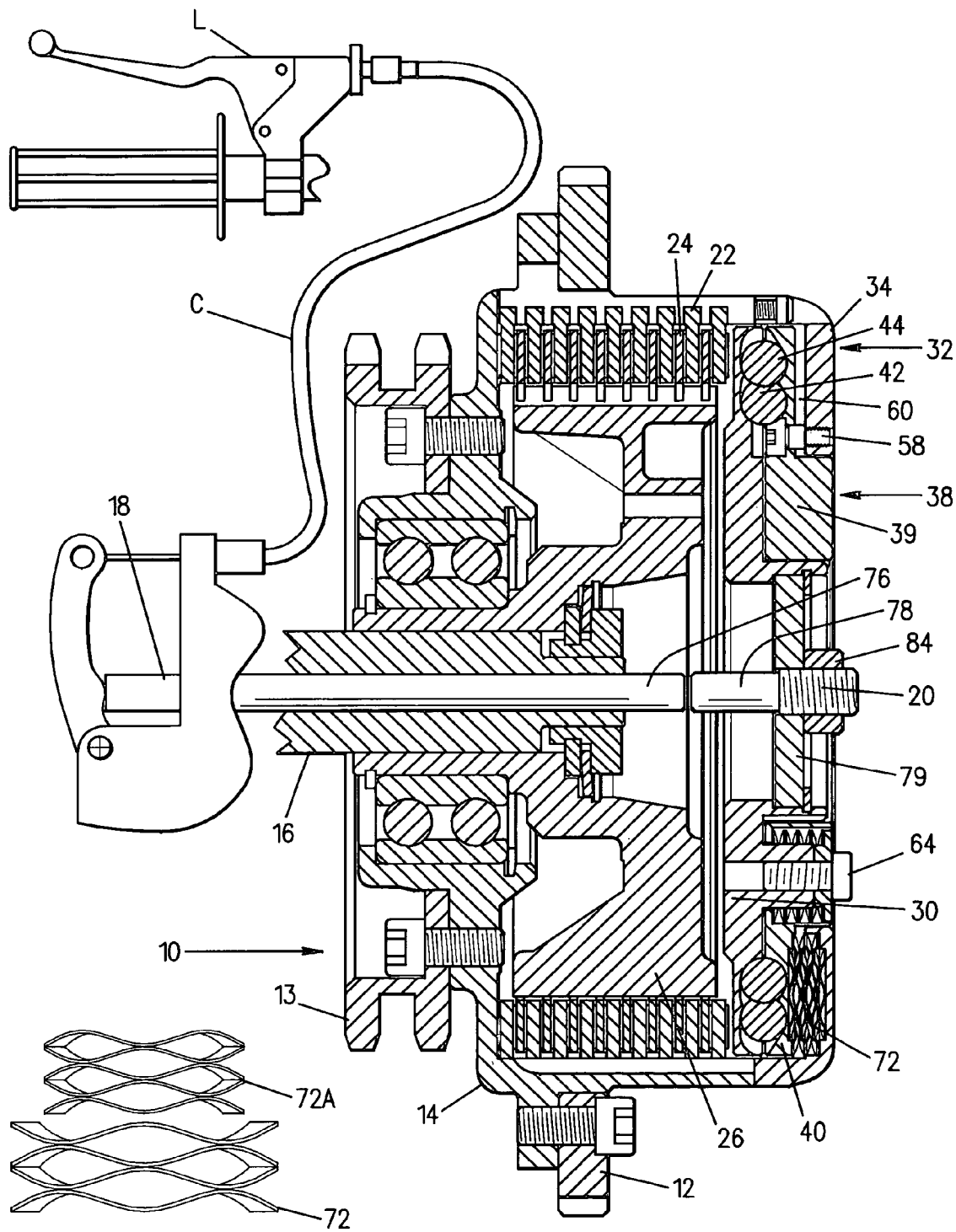
FIG. 1 is a view partially in section of a centrifugal clutch for a motorcycle and illustrating the clutch in a disengaging position.
FIG. 1A is a view in more detail of the maximum pressure wave springs employed.

Referring to the drawings, there is shown by way of illustrative example in FIGS. 1 to 14A a representative form of clutch 10 which is specifically adaptable for use in a motorcycle, not shown. In the standard motorcycle, a crankshaft from an engine imparts rotation to a power input side of the clutch through a shaft or pinion or a chain or other means. In the case shown, a chain is used to impart rotation to drive sprocket 13 on clutch housing 14. A transmission shaft 16 is mounted for rotation by a hub 26 when clutch plates 22 and 24 are engaged; and through a transmission, not shown, is operative to rotate a belt or chain drive, not shown, to the rear wheel of the motorcycle. A starter gear 12 can receive input power from a starter, not shown, to rotate the housing 14 and drive sprocket 13 which in turn rotates the crankshaft to start the engine. As illustrated in FIG. 1, a control rod 18 extends through the transmission shaft 16 and is manually controlled by a hand lever L typically mounted on the handlebar of the motorcycle and operates through a control cable C to force a threadedly adjustable stem 20 forwardly to disengage the clutch plates 22 and 24 between the outer housing 14 and hub 26, respectively.

As best seen from FIGS. 1 to 15, a cam-actuating mechanism 28 is mounted between a pressure plate 30 and a cover 32. The cover 32 comprises an annular stationary wall portion 34 having an outer peripheral edge 35 affixed to the housing 14 by suitable fasteners 36. In addition, the cover 32 includes an inner movable cover portion 38 made up of a relatively thick inner wall portion 39 and an outer relatively thin annular retainer portion 40 which extends directly behind the annular cover portion 34.

The cam-actuating mechanism 28 is comprised of radially inner and outer rows of circumferentially spaced cam members or balls 42 and 44 interposed between the pressure plate 30 and the retainer portion 40. The balls 42 and 44 are responsive to centrifugal force to roll outwardly along radial pockets or cam faces 46 and 48 in the pressure plate 30, shown in FIGS. 13 to 15, and aligned pockets or cam faces 50 and 52 in the retainer portion 40 of the cover 38, as shown in FIGS. 9 to 12, so as to cause the pressure plate 30 to axially displace the outer frictional clutch plates 22 into locking engagement with the inner clutch plates 24. The cam-actuating mechanism 28 is modified somewhat from that of hereinbefore referred to copending application for patent for MULTI-ROW CAM-ACTUATED CENTRIFUGAL CLUTCH by utilizing only one row of cam faces 46 and 50 in inner, staggered concentric relation to the outer row of cam faces 48 and 52, respectively, in the pressure plate 30 and cover portion 40. Nevertheless, it will be apparent that a third row of confronting cam faces in the pressure plate 30 and cover portion 40 may be utilized for a set of smaller balls, as shown and described in my hereinbefore referred to copending application for patent for MULTI-ROW CAM-ACTUATING CENTRIFUGAL CLUTCH to generate increased clamping force between the clutch plates 22 and 24.

In one aspect, the cam faces 50 and 52 are in the form of pockets of generally oval-shaped configuration indented in a flat surface of the movable cover portion 40 and are elongated in the radial direction. Similarly, the cam faces 46 and 48 in the pressure plate 30, as best seen from FIGS. 14 and 15, are in the form of radial pockets of generally concave configuration elongated in a radial direction and correspond in size and configuration to the aligned cam faces 50 and 52 in the retainer portion. However, the cam faces 48 in the outer row of the pressure plate 30 each terminate in flattened surface portions 49 so as to form a stop point at the outer peripheral edge of the pressure plate 30 to limit the travel of the cam members 44. Just inwardly of the inner row of cam faces 46, a plurality of circumferentially spaced counterbores 54 are aligned with bores 56 in the cover portion 38, the bores 56 being adapted for insertion of threaded fasteners in the form of shoulder bolts 58 between the cover portions 38 and 32 while leaving a predetermined spacing or clearance 60 between the cover portions for a purpose to be hereinafter described. It will be noted that the cover portion 38 is axially displaceable with respect to the threaded fasteners in the form of shoulder bolts 58 so as to move through the clearance space 60 in response to increased spreading forces applied by the balls 42 and 44 after the clutch plates 22 and 24 have moved, into clutching engagement as will be later described with reference to FIG. 3.

A second series of circumferentially spaced bores 62 are formed in the cover 38 in the raised or center portion 39 of the cover 38 and are adapted to receive tubular posts 63 extending from the pressure plate 30 for insertion of threaded fasteners in the form of bolts 64. A spring retainer in the form of a washer 65 having an annular shoulder 66 is positioned at one end of each tubular post 63 to receive each bolt 64. The wall of each bore 62 is provided with an annular shoulder 68 in opposed facing relation to the external shoulder 66 so that the shoulders 66 and 68 define end stops for a spring 70 which is mounted under compression therebetween. The springs 70 pre-load the balls 42 and 44 under a predetermined amount of force to resist outward radial movement of the balls 42 and 44 until the engine reaches a predetermined speed imparting a sufficient degree of centrifugal force to the balls 42 and 44 to advance outwardly along their respective cam faces. The pre-compression or pre-loading of the springs 70 can be adjusted by shims 71 as well as the inward threading of each bolt 64 to vary the distance between the shoulders 66 and 68. Preferably, the springs 70 are SPIRAWAVE® wave springs which are flat wire compression springs, Model No. C075 manufactured and sold by Smalley Steel Ring Co. of Lake Zurich, Ill.

Figure 2:
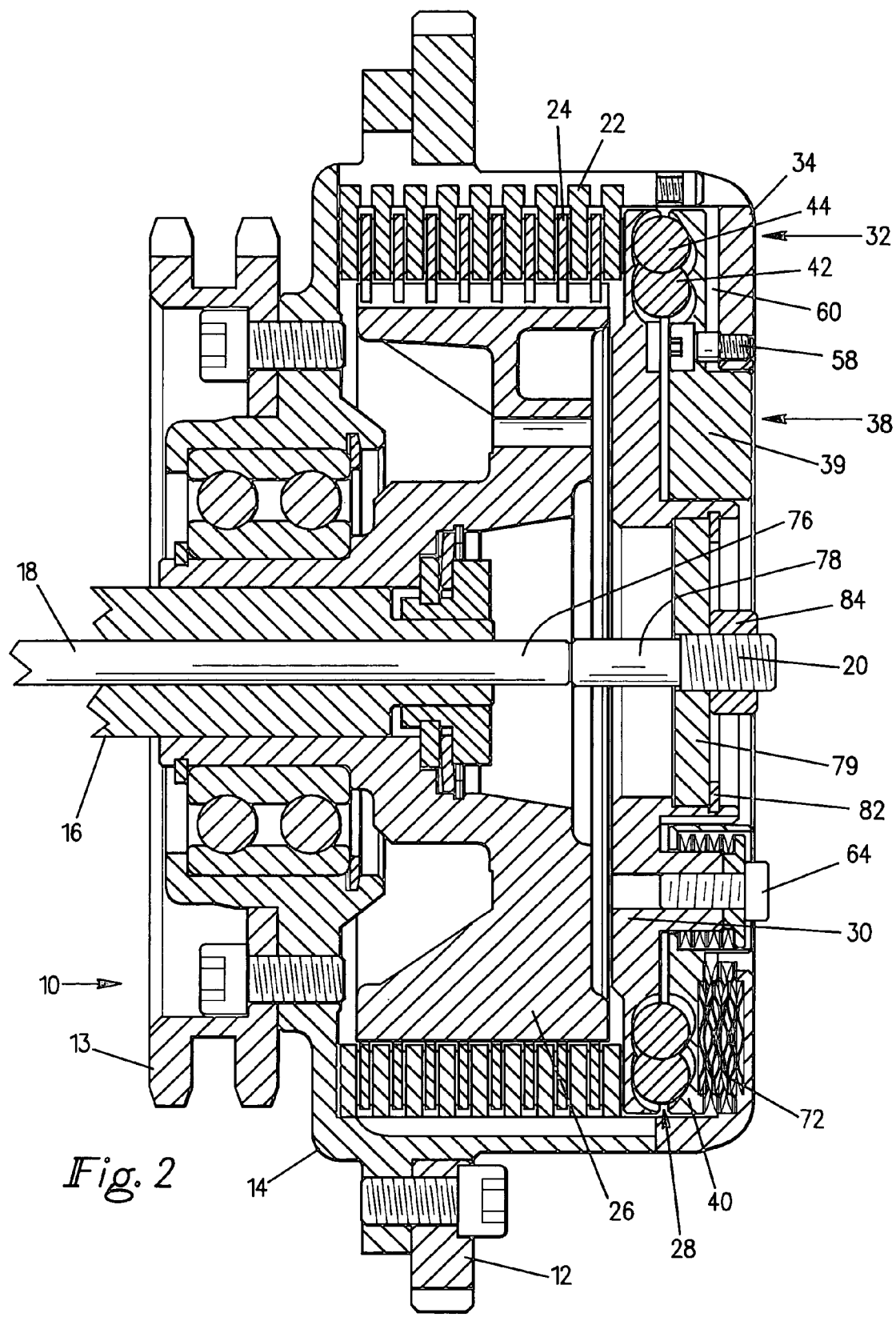
FIG. 2 is a view similar to FIG. 1 but illustrating the clutch in an engaged position.

A series of maximum pressure spring pairs 72, 72A are mounted between counterbored seats 74 in circumferentially spaced relation to one another around the outer periphery of the cover portion 40 and aligned bores or spring seats 75 in the confronting surface of the cover 32. Preferably, the spring pairs 72, 72A are made up of inner and outer concentric SPIRAWAVE® wave springs as illustrated in the detail view of FIG. 1A which in unison will be compressed as the pressure plate 30 and cover portion 40 are expanded to move the clutch plates 22 and 24 into engagement, as shown in FIG. 2, until the clamping force exerted on the clutch plates 22 and 24 equals the resisting force exerted by the springs 72, 72A. Further, the clearance space 60 between the cover portions 32 and 40 will engage or enable limited movement of the cam-actuating mechanism 28 away from the clutch portions 22 and 24 before the springs 72, 72A are compressed beyond their usable travel, which is the amount of deflection without permanent deformation of the springs 72, 72A.

An important characteristic of the SPIRAWAVE® wave springs 72 and 72A is their greatly reduced height or travel for a given amount of resistance as compared to standard coil springs and therefore occupy much less space in an axial direction. In this way, the cam-actuating mechanism 28 together with the spring force-limiting mechanism as described will fit into existing clutch housings, such as, the twin cam 88 of Harley-Davidson Motor Company of Milwaukee, Wis. and other makes of motorcycles. The spring force of the springs 72, 72A is such as to resist opening or spreading of the pressure plate 30 and cover portion 40 beyond a predetermined limit. That limit is the maximum clamping force that can be safely exerted on the clutch plates 22 and 24 to assure non-slipping engagement under normal operating conditions but which will permit the clutch plates 22 and 24 to slip in the event that extreme shock loads are transmitted through the drive train. For example, the clutch plates will permit slight or instantaneous slippage so as to absorb any shock loading when the rear wheel of the motorcycle is off the ground and spinning then suddenly hits the ground and is stopped while the engine continues to run. When extreme clamping forces of that nature are applied, the cam-actuating mechanism 28 will overcome the force or bias of the springs 72, 72A to shift away from the clutch plates 22 and 24, as best seen from FIG. 4, through the clearance space 60. This enables limited movement of the entire cam-actuating mechanism 28 away from the clutch plates 22 and 24 until the cover portion 40 abuts the cover portion 34.

Sufficient clearance is provided, also, between the clutch plates 22 and 24 and pressure plate 30 as generally designated at 61 to adjust for any wear in the clutch plates 22 and 24. For example, as the clutch plates 22 and 24 undergo wear, they will create a greater clearance space 61, but the cam-actuating mechanism is capable of undergoing greater spreading before the maximum pressure springs 72, 72A will exert a counteracting force on the cam-actuating mechanism 28.

FIG. 1 illustrates the clutch 10 at rest or operating at low speeds with the clutch plates 22 and 24 therefore disengaged. As engine speed increases, the balls 42 and 44 will advance radially outwardly to force the pressure plate 30 toward the clutch plates 22 and 24 and simultaneously urge the cover portion 40 in the opposite direction against the resistance of the springs 72, 72A until the resistance of the clutch plates equals that of the springs 72, 72A, for example, as illustrated in FIG. 2.

Figure 3:
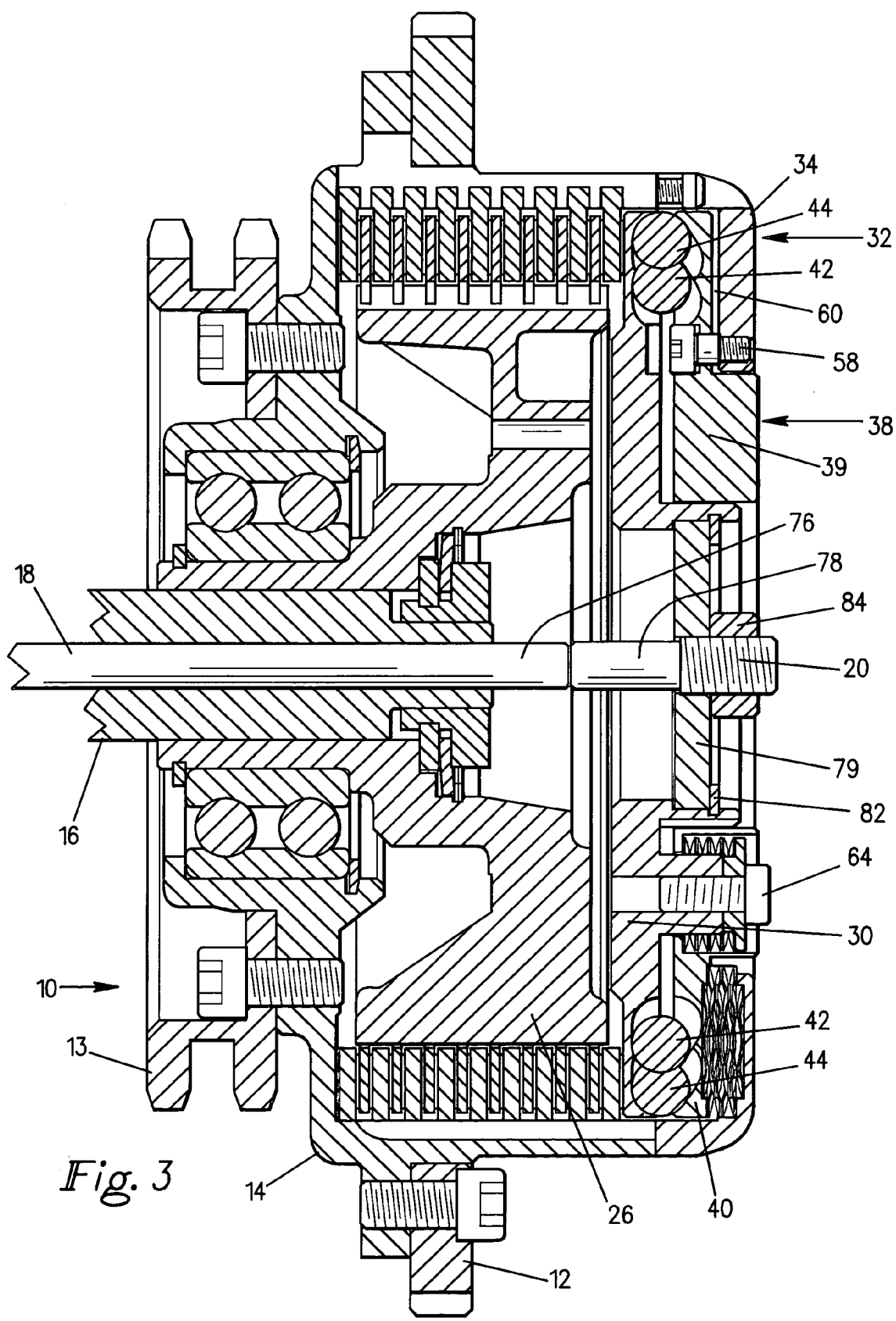
FIG. 3 is a view similar to FIGS. 1 and 2 illustrating the clutch engaged at maximum force.

As illustrated in FIG. 3, as the balls 42 and 44 continue to move outwardly under increasing speeds, the cover portion 40 will continue to advance axially against the springs 72, 72A so that no increased force is applied to the clutch plates, and the balls 42 and 44 will have reached the limit of the ball pockets, as illustrated in FIG. 3. A notable advantage of utilizing concentric wave springs 72, 72A of the type described is that the stationary cover 32 retains sufficient strength to avoid expansion or buckling of the cover 32 when maximum forces are applied to the springs 72, 72A. In addition, the spring force can be adjusted by selecting the number of springs 72 to be inserted between the pressure plate 30 and cover portion 40. For example, a spring 72 may be positioned in every other spring seat 75. Correspondingly, the number of inner springs 72A may be varied but preferably are used only in combination with an outer spring 72. Further, the amount or degree of pre-loading force of resistance of the springs 70 can be fine-tuned or adjusted by the utilization or one or more shims 71.

Figure 4:
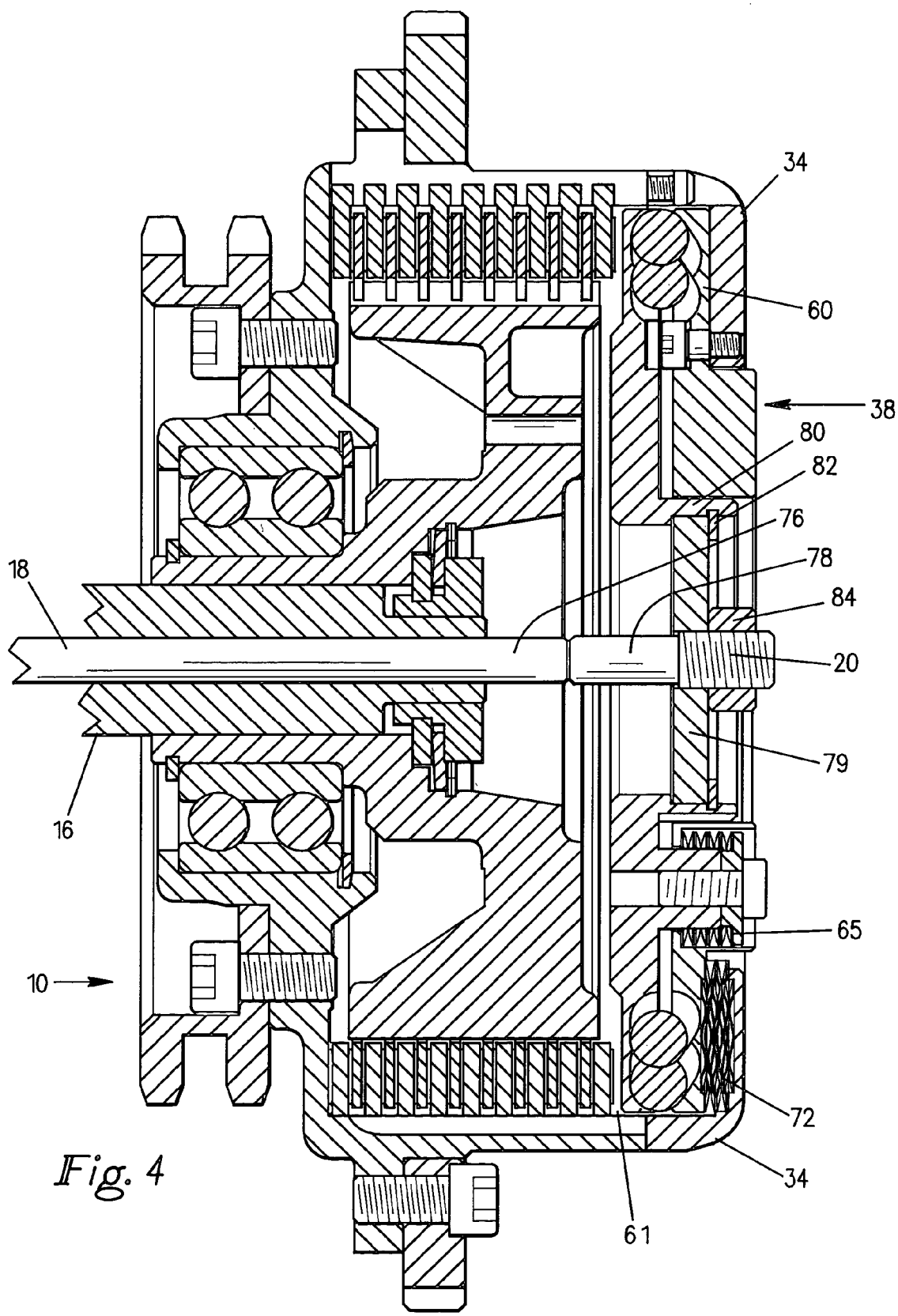
FIG. 4 is a view similar to FIGS. 1 to 3 but illustrating the clutch disengaged by a manual override mechanism.
Figure 5:
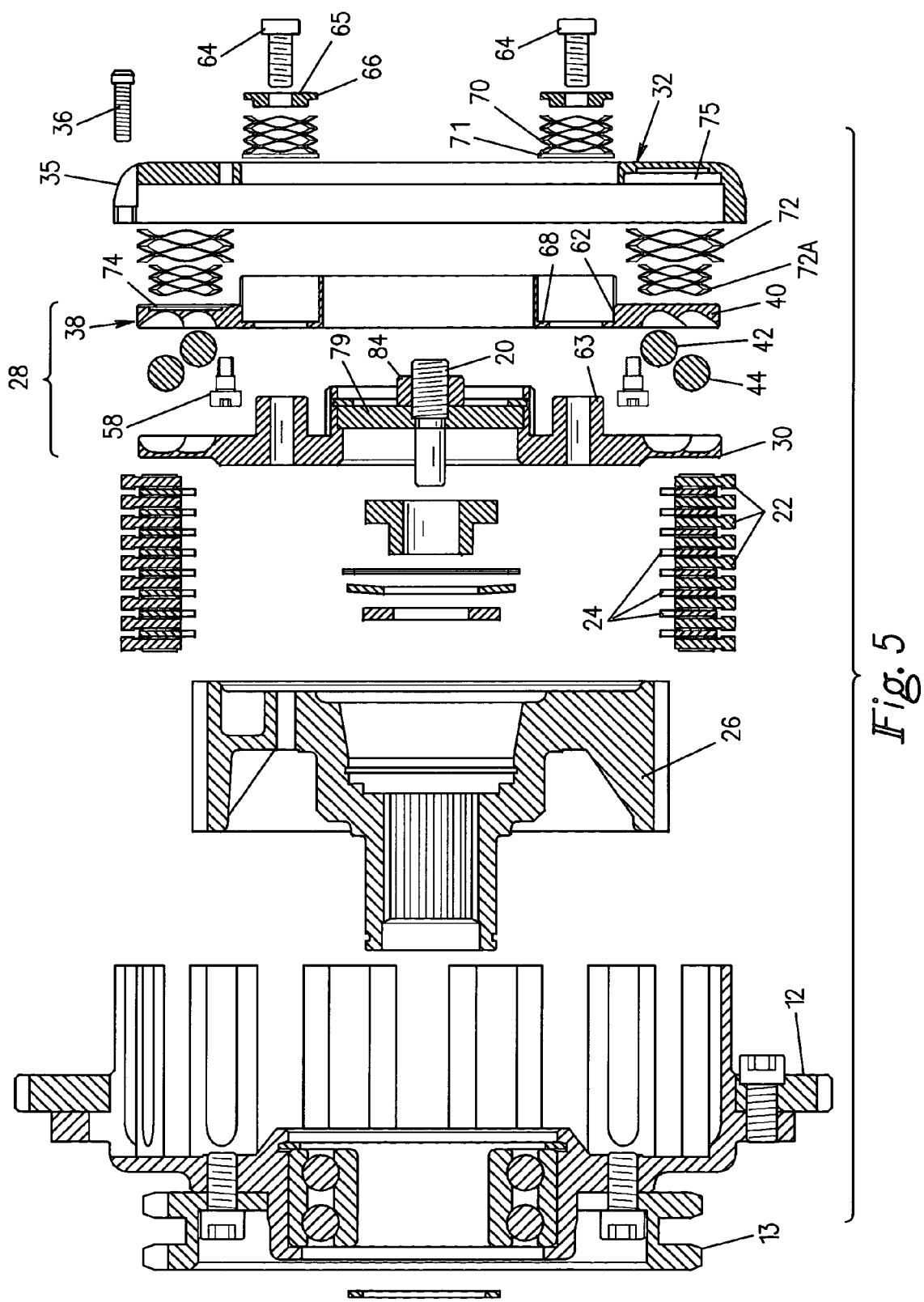
FIG. 5 is an exploded view of the major elements of the clutch shown in FIGS. 1 to 4.

There are certain conditions under which it is desirable to be able to control the clutch manually and to override the automatic clutch. As illustrated in FIGS. 1 to 4, the push rod 18 extends through the transmission shaft 16 from the manual control lever L which operates the push rod 18 through the control cable C as shown in FIG. 1. A leading end 76 of the push rod is aligned with a trailing end 78 of the threadedly adjustable stem 20, and the stem 20 threadedly engages a disk 79 having an outer peripheral edge which is fixed to an inner wall 80 of the pressure plate 30 by a snap ring 82. A lock nut 84 is threaded onto the stem 20 to fix the axial disposition or relationship of the stem 20 to the push rod 18 and control the distance of travel of the pressure plate 30 in response to actuation of the push rod 18. Accordingly, when the push rod 18 is actuated by the control lever, it will cause the entire cam-actuating mechanism 28 to be displaced away from the clutch plates 22 and 24, as illustrated in FIG. 4. At low speeds, engaging the push rod 18 will cause the pressure plate 30 to be held away from the clutch plates 22 and 24. This requires no or minor compression of the springs 70 so that the physical effort required to hold the pressure plate is minimal. At high speeds, the push rod 18 can still be engaged to release the clutch but have to move the entire cam-actuating mechanism 28 as an assembly away from the clutch plates 22 and 24 by compressing the springs 72, 72A. This requires a greater physical force than at low speeds but never more than the force exerted by the springs 72, 72A.

The following are representative of different situations in which it is desirable to manually disengage the clutch:

1. Manually disengage at start of a race and rev up the engine to create a sufficiently high torque that a fast start can be initiated.

2. In traversing a curve or corner, to disengage the clutch to cut speed but rev up the engine and engage it to accelerate quickly.

3. When starting the engine with transmission in gear, manually disengage the clutch to keep the motorcycle at rest.

4. In climbing a hill, slipping the clutch manually makes it easier to generate higher engine speed in order to get more power to get up the hill.

5. To lift the front wheel over an obstacle, manually disengage the clutch, increase engine speed and re-engage the clutch for rapid acceleration.

As shown in FIG. 3, when the speed is reduced below that required to move the clutch plates 22 and 24 into engagement, the springs 70 will rapidly force the balls 42, 44 to move inwardly and permit the pressure plate 30 to retract away from the clutch plates 22, 24 and return to the position shown in FIG. 1.

It will be evident that other spring types may be utilized in place of the SPIRAWAVE® wave springs 70 depending upon the spring force required to counteract the centrifugal force of the cam-actuating mechanism 28 as well as the space available for a given amount of counteracting spring force required. Other factors to be considered are the amount of torque that the clutch is required to transmit, the size of the clutch plates 22 and 24, and the hand pressure required to disengage the clutch manually. Accordingly, other types of springs may be utilized, such as, coil springs and Belleville washer springs, the latter extending through a circumferential groove in the inner surface of the cover; however, for a given size or thickness of cover will be substantially weakened by a continuous circumferential groove, and a continuous spring element ordinarily will not achieve the same spring force for a given distance of travel.

MODIFIED EMBODIMENT

Figure 16:
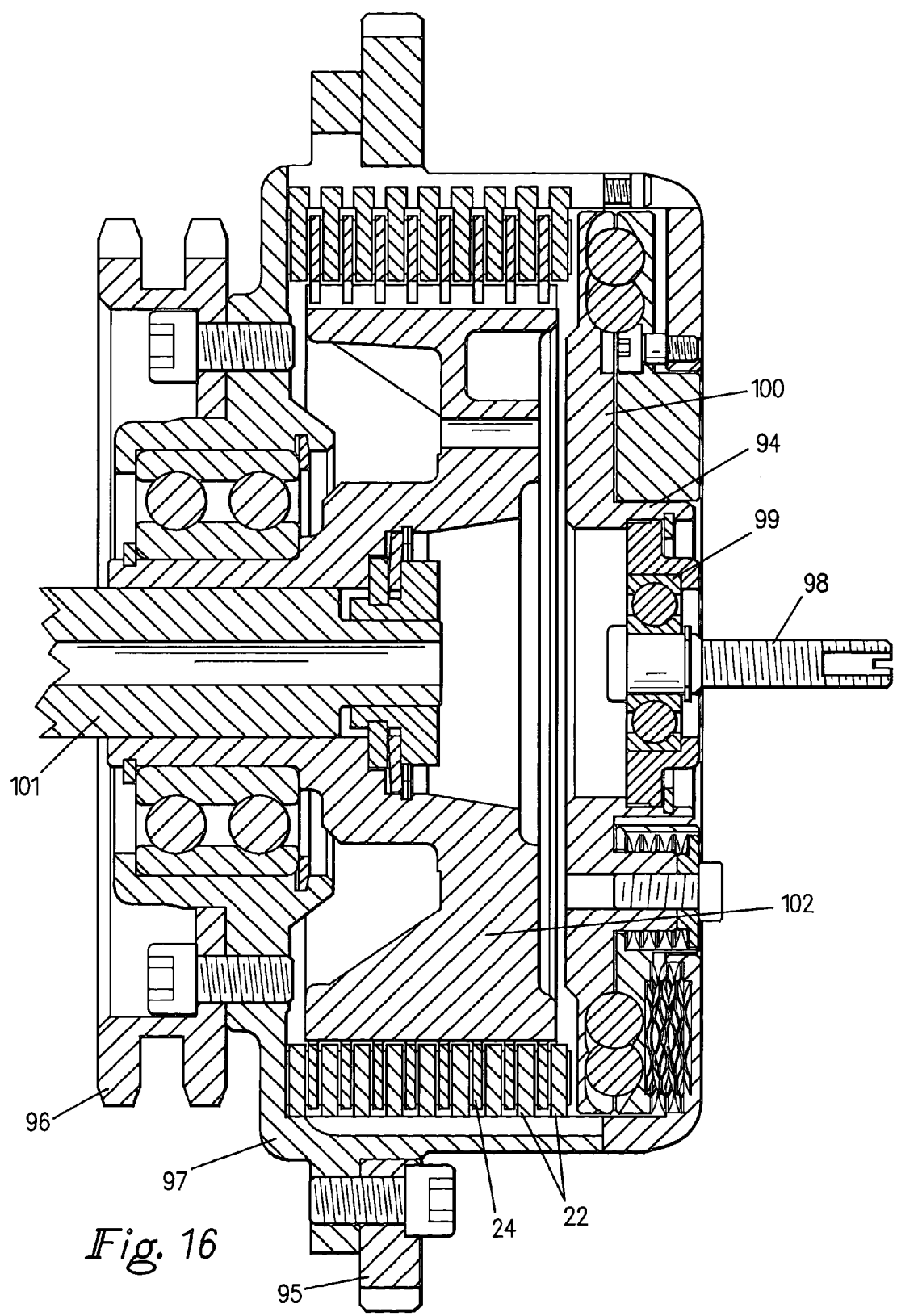
FIG. 16 is a view partially in section of a modified accordance with the present invention.

A modified embodiment is illustrated in FIG. 16 in which like parts are correspondingly enumerated to the preferred form of FIGS. 1 to 15. When employed in a motorcycle, a chain imparts rotation to drive sprocket 96 on clutch housing 97. A transmission shaft 101 is mounted for rotation by hub 102 when the clutch plates 22 and 24 are engaged; and through a transmission, not shown, is operative to rotate a belt or chain drive, not shown, to the rear wheel of the motorcycle. A starter gear 95 is operative to rotate the housing 97 and the drive sprocket 96 which in turn rotates a crankshaft to start the engine. A pull rod or stem 98 is used in place of the push rod 18 and threaded stem 20 of the preferred form to manually disengage the clutch. Thus, the stem 98 is journaled to the cover portion 94 by a ball bearing assembly 99 which is mounted in the center of the pressure plate 100. The stem or control rod 98 may be directly controlled by a hand lever, not shown, in the same manner as the lever L of FIG. 1.

Both with respect to the preferred and modified embodiments, it will be appreciated that they are readily conformable for use in other applications than motorcycles and are adaptable for use in any application which employs an internal combustion engine, such as, for instance drag racing, cars, trucks, tractors, go-carts, cement mixers, all terrain vehicles, power tools including but not limited to chain saws and weed eaters and virtually any application in which an automatic clutch can be utilized.

It is therefore to be understood that while preferred and modified forms are herein set forth and described, the above and other modifications may be made therein as defined by the appended claims and reasonable equivalents thereof.

We claim:

1. In a centrifugal clutch having a plurality of cam members interposed between a cover and pressure plate, the cam members being movable radially outwardly under centrifugal force to cause the pressure plate to move in a direction forcing a plurality of clutch members into clutching engagement, the improvement comprising:
   cam retainer means between said pressure plate and cover for guiding inward and outward radial movement of said cam members;
   first means for maintaining a predetermined spacing between said cover and said retainer means;
   second means for maintaining a predetermined spacing between said pressure plate and said retainer means including means biasing said pressure plate and said retainer means towards one another; and
   a series of circumferentially spaced resilient biasing means interposed between said cover and said retainer means and wherein said resilient biasing means is operative to undergo compression in response to continued radially outward movement of said cam members when the force exerted on said clutch members equals the force exerted by said resilient biasing means on said pressure plate and retainer means.

2. In a centrifugal clutch according to claim 1 wherein said cam retainer means includes a plurality of first indented cam faces arranged in concentric rows, each of said cam faces including a ramp inclining radially outwardly in a direction towards said pressure plate.

3. In a centrifugal clutch according to claim 2 wherein said pressure plate includes a plurality of second indented cam faces aligned with said first indented cam faces to define complementary pairs of said cam faces, each said complementary pair receiving one of said cam members therebetween.

4. In a centrifugal clutch according to claim 1 wherein said first means comprises threaded members extending between said cover and said retainer means.

5. In a centrifugal clutch according to claim 1 wherein said second means includes biasing members between said pressure plate and said retainer means.

6. In a centrifugal clutch according to claim 5 wherein said second means comprises a plurality of circumferentially spaced threaded members connected to said pressure plate and said biasing members are associated with each of said threaded members.

7. In a centrifugal clutch according to claim 6 wherein said biasing members comprises spring members so mounted as to yieldingly compress said pressure plate and said retainer means toward one another.

8. In a centrifugal clutch according to claim 1 wherein disengagement means is provided for locking said pressure plate against advancement into engagement with said clutch members independently of the speed of rotation of said clutch.

9. In a centrifugal clutch according to claim 8 wherein said disengagement means includes a control rod and means for connecting said control rod to said pressure plate.

10. In a centrifugal clutch according to claim 9 wherein said control rod extends centrally of said housing, and said connecting means includes a threadedly adjustable stem in the path of movement of said control rod.

11. In a centrifugal clutch having a plurality of cam members interposed between a cover and pressure plate, said cam members being movable radially outwardly under centrifugal force to cause said pressure plate to move in a direction forcing a plurality of clutch members into clutching engagement, the improvement comprising:
cam retainer means between said pressure plate and said cover for retaining said cam members in a plurality of concentric rows whereby to guide inward and outward radial movement of said cam members;
first fastener means for maintaining a predetermined spacing between said cover and said retainer means;
second fastener means for maintaining a predetermined spacing between said pressure plate and said retainer means including means biasing said pressure plate and said retainer means toward one another;
a series of circumferentially spaced resilient biasing means interposed between said cover and said retainer means and wherein said resilient biasing means is defined by circumferentially spaced compression springs adapted to undergo compression in response to continued radially outward movement of said cam members once the force exerted on said clutch members equals the force exerted by said resilient biasing means on said pressure plate and retainer means; and
manual disengagement means engageable with said pressure plate to prevent engagement between said pressure plate and said clutch members independently of the speed of rotation of said clutch.

12. In a centrifugal clutch according to claim 11 wherein said disengagement means is provided for locking said pressure plate against advancement into engagement with said clutch members.

13. In a centrifugal clutch according to claim 12 wherein said disengagement means includes a control rod and means for connecting said control rod to said pressure plate.

14. In a centrifugal clutch according to claim 13 wherein said control rod extends centrally of said housing, and said connecting means includes a threadedly adjustable stem in the path of movement of said control rod.

15. In a centrifugal clutch according to claim 11 wherein said pressure plate and said retainer means include a plurality of indented cam faces arranged in inner and outer concentric rows and aligned with and facing one another to define complementary pairs of said cam faces, each said complementary pair receiving one of said cam members therebetween.

16. In a centrifugal clutch according to claim 15 wherein said outer concentric row of said cam faces each includes a ramp inclining radially outwardly in a direction towards said pressure plate.

17. In a centrifugal clutch according to claim 16 wherein said first fastener means comprises threaded members extending between said cover and said retainer means.

18. In a centrifugal clutch according to claim 17 wherein said second fastener means comprises a plurality of circumferentially spaced threaded members interconnecting said pressure plate and said retainer means, and compression spring members associated with said threaded members to bias said pressure plate and said retainer means toward one another.

19. In a centrifugal clutch according to claim 11 wherein said resilient biasing means comprises a plurality of circumferentially spaced compression springs extending between outer peripheral portions of said cover and said retainer means.

20. In a centrifugal clutch according to claim 19 wherein each of said springs is a flat wire compression spring.

21. In a centrifugal clutch according to claim 20 wherein each of said spring elements is a SPIRAWAVE® spring.

22. A centrifugal clutch having a rotary member to be driven, a hub coupled to said rotary member, a rotatable housing in outer spaced concentric relation to said rotary member, clutch members mounted for relative axial displacement into and out of engagement with one another between said hub and said housing, and a pressure plate axially displaceable between a cover and said clutch members; a plurality of cam members interposed between said cover and said pressure plate being movable radially outwardly at a predetermined speed of rotation to force said pressure plate axially away from said cover and in a direction causing said clutch members to move into clutching engagement with one another including cam guide means between said pressure plate and said cover for guiding the radial movement of said cam members; and pressure means between said cover and said pressure plate to prevent shock loads from being imparted to said clutch members when said clutch members are in clutching engagement with one another.

23. A clutch for motorcycles disposed between a crankshaft of an engine and a transmission shaft wherein said clutch is provided with an inner hub coupled to said transmission shaft, an outer housing coupled to said crankshaft, frictional clutch members alternately extending from and fixed for rotation with said hub and said housing, respectively, and being axially displaceable into and away from frictional engagement with one another, a pressure plate at one end of said clutch members including spring means biasing said pressure plate in an axial direction away from said clutch members, and centrifugal force-responsive means movable radially and outwardly along said pressure plate to overcome said spring means and force said pressure plate axially against an endmost of said clutch members whereby to impart rotation between said housing and said hub, an elongated control rod extending centrally of said housing and being axially slidable with respect to said housing, actuating means between one end of said rod and said pressure plate being movable in response to axial movement of said rod to displace said pressure plate in an axial direction independently of said spring means, manual control means for selectively advancing and retracting said rod in an axial direction whereby to manually control engagement and release of said clutch members independently of the speed of rotation of said clutch and pressure control means between said cover and said pressure plate to absorb shock loads between said clutch member and said transmission shaft.

24. An automatic clutch according to claim 23, said centrifugal force-responsive means having circumferentially spaced first and second cam faces disposed in facing relation to one another between said pressure plate and said housing, said first and second cam faces arranged in a plurality of concentric rows.

25. An automatic clutch according to claim 24, a plurality of cam members disposed between said first and second cam faces in each of said concentric rows wherein said cam members are movable radially outwardly between said cam faces to force said housing axially away from said drive unit and in a direction causing said clutch members to move into clutching engagement with one another.

26. An automatic clutch according to claim 23 wherein said centrifugal force-responsive means includes circumferentially spaced rows of first and second cam faces disposed in facing relation to one another between said pressure plate and said cover and a plurality of cam members disposed between said first and second cam faces being movable radially outwardly between said cam faces to force said pressure plate in an axial direction causing said clutch members to move into clutching engagement with one another.

27. An automatic clutch according to claim 23 wherein said spring means includes a plurality of circumferentially spaced compression springs interposed between said cover and said centrifugal force-responsive means.

28. An automatic clutch according to claim 27 wherein said compression springs are flat wire wave springs.

29. An automatic clutch according to claim 28 wherein each of said compression springs includes inner and outer concentric flat wire wave springs mounted in spring seats between said cover and said centrifugal force-responsive means.

30. An automatic clutch according to claim 29 wherein said cover includes an axially movable portion interposed between said cover and said pressure plate.

* * * * *

(12) EX PARTE REEXAMINATION CERTIFICATE (7863rd)
United States Patent
Drussel et al.

(10) Number: US 7,014,026 C1
(45) Certificate Issued: Nov. 9, 2010

(54) MANUAL/AUTOMATIC PRESSURE CONTROL MECHANISM FOR CENTRIFUGAL CLUTCH

(75) Inventors: Douglas W. Drussel, Sedalia, CO (US); George Michael Wilfley, Englewood, CO (US)

(73) Assignee: Drussel Wilfley Design, L.L.C., Denver, CO (US)

Reexamination Request:
No. 90/010,227, Jul. 28, 2008

Reexamination Certificate for:
Patent No.: 7,014,026
Issued: Mar. 21, 2006
Appl. No.: 10/791,949
Filed: Mar. 2, 2004

Related U.S. Application Data

(63) Continuation-in-part of application No. 10/327,160, filed on Dec. 20, 2002, now Pat. No. 6,814,208, and a continuation-in-part of application No. 09/877,518, filed on Jun. 7, 2001, now Pat. No. 6,705,446.

(51) Int. Cl.
*F16D 19/00* (2006.01)
*F16D 43/08* (2006.01)

(52) U.S. Cl. ..................... 192/105 B; 192/83

(58) Field of Classification Search ............. 192/105 B, 192/70.23, 89.1, 93 C
See application file for complete search history.

(56) References Cited

U.S. PATENT DOCUMENTS

| 2,368,299 A | 1/1945 | Hayter |
| 3,939,734 A | 2/1976 | Blanchette |
| 4,550,817 A | 11/1985 | Euler |
| 4,679,682 A | 7/1987 | Gray |

OTHER PUBLICATIONS

Harley–Davidson, Clutch Assembly, Harley–Davidson 1999 Softail Service Manual, 1998, pp. 6–9 Figure 6–17, Harley Davidson, USA.

*Primary Examiner*—Matthew C. Graham

(57) ABSTRACT

A centrifugal clutch for motorcycles having a cam-actuating mechanism to force a series of clutch plates into clutching engagement at a predetermined speed, a pressure limiting spring assembly limits the axial force transmitted to the clutch members at higher speeds so that the torque transmission characteristics of the clutch are similar to a manual clutch, and a manual override is capable of maintaining the clutch plates in the disengaged position at lower speeds as well as shifting the clutch members out of clutching engagement at higher speeds with relatively low exertion of manual or hand pressure.

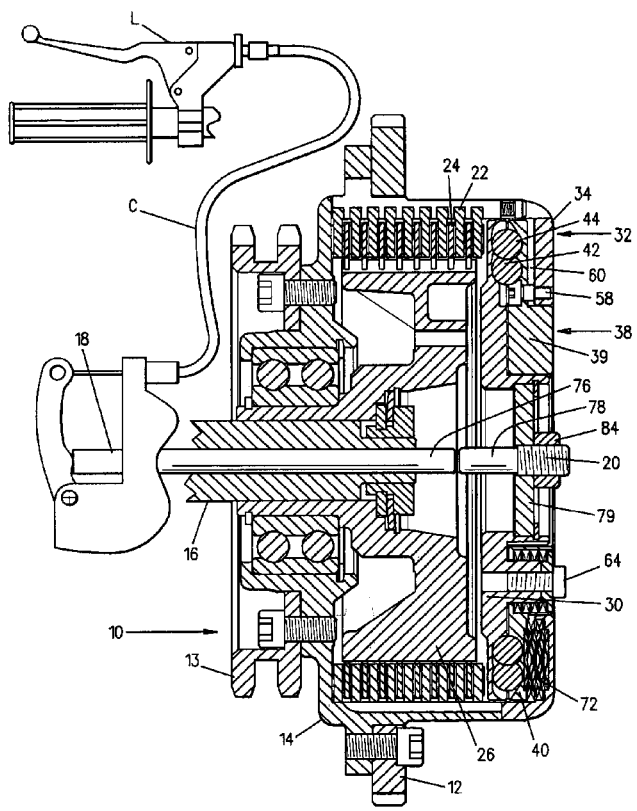

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 13, 22, 29 and 30 are cancelled.

Claims 1, 3, 11, 14, 23 and 26 are determined to be patentable as amended.

Claims 4-10, 12, 15-21, 24, 25, 27 and 28, dependent on an amended claim, are determined to be patentable.

New claims 31-34 are added and determined to be patentable.

1. In a centrifugal clutch having a plurality of cam members interposed between a cover and pressure plate, the cam members being movable radially outwardly under centrifugal force to cause the pressure plate to move in a direction forcing a plurality of clutch members into clutching engagement, the improvement comprising:
cam retainer means between said pressure plate and cover for guiding inward and outward radial movement of said cam members, *and wherein said cam retainer means includes a plurality of first indented cam faces arranged in concentric rows, each of said cam faces including a ramp inclining radially outwardly in a direction towards said pressure plate*;
first means for maintaining a predetermined spacing between said cover and said retainer means;
second means for maintaining a predetermined spacing between said pressure plate and said retainer means including means biasing said pressure plate and said retainer means towards one another; and
a series of circumferentially spaced resilient biasing means interposed between said cover and said retainer means and wherein said resilient biasing means is operative to undergo compression in response to continued radially outward movement of said cam members when the force exerted on said clutch members equals the force exerted by said resilient biasing means on said pressure plate and retainer means.

3. In a centrifugal clutch according to claim [2] *1* wherein said pressure plate includes a plurality of second indented cam faces aligned with said first indented cam faces to define complementary pairs of said cam faces, each said complementary pair receiving one of said cam members therebetween.

11. In a centrifugal clutch having a plurality of cam members interposed between a cover and pressure plate, said cam members being movable radially outwardly under centrifugal force to cause said pressure plate to move in a direction forcing a plurality of clutch members into clutching engagement, the improvement comprising:
cam retainer means between said pressure plate and said cover for retaining said cam members in a plurality of concentric rows whereby to guide inward and outward radial movement of said cam members;
first fastener means for maintaining a predetermined spacing between said cover and said retainer means;
second fastener means for maintaining a predetermined spacing between said pressure plate and said retainer means including means biasing said pressure plate and said retainer means toward one another;
a series of circumferentially spaced resilient biasing means interposed between said cover and said retainer means and wherein said resilient biasing means is defined by circumferentially spaced compression springs adapted to undergo compression in response to continued radially outwardly movement of said cam members once the force exerted on said clutch members equals the force exerted by said resilient biasing means on said pressure plate and retainer means; and
manual disengagement means engageable with said pressure plate to prevent engagement between said pressure plate and said clutch members independently of the speed of rotation of said clutch, *wherein said disengagement means includes a control rod and means for connecting said control rod to said pressure plate*.

14. In a centrifugal clutch according to claim [13] *11* wherein said control rod extends centrally of said housing, and said connecting means includes a threadedly adjustable stem in the path of movement of said control rod.

23. A clutch for motorcycles disposed between a crankshaft of an engine and a transmission shaft wherein said clutch is provided with an inner hub coupled to said transmission shaft, an outer housing coupled to said crankshaft, frictional clutch members alternately extending from and fixed for rotation with said hub and said housing, respectively , and being axially displaceable into and away from frictional engagement with one another, a pressure plate at one end of said clutch members including spring means biasing said pressure plate in an axial direction away from said clutch members, and centrifugal force-responsive means movable radially and outwardly along said pressure plate to overcome said spring means and force said pressure plate axially against an endmost of said clutch members whereby to impart rotation between said housing and said hub, *disengagement means including* an elongated control rod extending centrally of said housing and being axially slidable with respect to said housing[, actuating] *and* means [between] *for connecting* one end of said *control* rod [and] *to* said pressure plate *and* being movable in response to axial movement of said rod to displace said pressure plate in an axial direction independently of said spring means, manual control means for selectively advancing and retracting said rod in an axial direction whereby to manually control engagement and release of said clutch members independently of the speed of rotation of said clutch and pressure control means between said cover and said pressure plate to absorb shock loads between said clutch member and said transmission shaft.

26. An automatic clutch according to claim 23 wherein said centrifugal force-responsive means includes circumferentially spaced rows of first and second *indented* cam faces disposed in facing relation to one another between said pressure plate and said cover and a plurality of cam members disposed between said first and second cam faces being movable radially outwardly between said cam faces to force said pressure plate in an axial direction causing said clutch members to move into clutching engagement with one another.

*31. A clutch for motorcycles disposed between a crankshaft of an engine and a transmission shaft wherein said* clutch is provided with an inner hub coupled to said transmission shaft, an outer housing coupled to said crankshaft, frictional clutch members alternately extending from and fixed for rotation with said hub and said housing, respectively, and being axially displaceable into and away from frictional engagement with one another, a pressure plate at one end of said clutch members including spring means biasing said pressure plate in an axial direction away from said clutch members, and centrifugal force-responsive means movable radially and outwardly along said pressure plate to overcome said spring means and force said pressure plate axially against an endmost of said clutch members whereby to impart rotation between said housing and said hub, an elongated control rod extending centrally of said housing and being axially slidable with respect to said housing, actuating means between one end of said rod and pressure plate being movable in response to axial movement of said rod to displace said pressure plate in an axial direction independently of said spring means, manual control means for selectively advancing and retracting said rod in an axial direction whereby to manually control engagement and release of said clutch members independently of the speed of rotation of said clutch, and pressure control means between said cover and said pressure plate to absorb shock loads between said clutch member and said transmission shaft, and said centrifugal force-responsive means having circumferentially spaced first and second cam faces disposed in facing relation to one another between said pressure plate and said housing, said first and second cam faces arranged in a plurality of concentric rows.

32. A centrifugal clutch having a rotary member to be driven, a hub coupled to said rotary member, a rotatable housing in outer spaced concentric relation to said rotary member, cltuch members mounted for relative axial displacement into and out of engagement with one another between said hub and said housing, and a pressure plate axially displaceable between a cover and said clutch members; a plurality of cam members interposed between said cover and said pressure plate being movable radially outwardly at a predetermined speed of rotation to force said pressure plate axially away from said cover and in a direction causing said clutch members to move into clutching engagement with one another including cam guide means between said pressure plate and said cover for guiding the radial movement of said cam members; and pressure means between said cover and said pressure plate to prevent shock loads from being imparted to said clutch members when said clutch members are in clutching engagement with one another wherein said pressure means enables slippage between said clutch members when shock loads are applied thereto.

33. A clutch according to claim 23 wherein said control rod extends through the substantial length of said housing.

34. A clutch according to claim 33 including an axially adjustable stem in the path of movement of said control rod.

* * * * *